Oct. 25, 1938.   G. SLAYTER   2,134,009
LOW TEMPERATURE INSULATION
Filed Sept. 25, 1935
FIG-1-
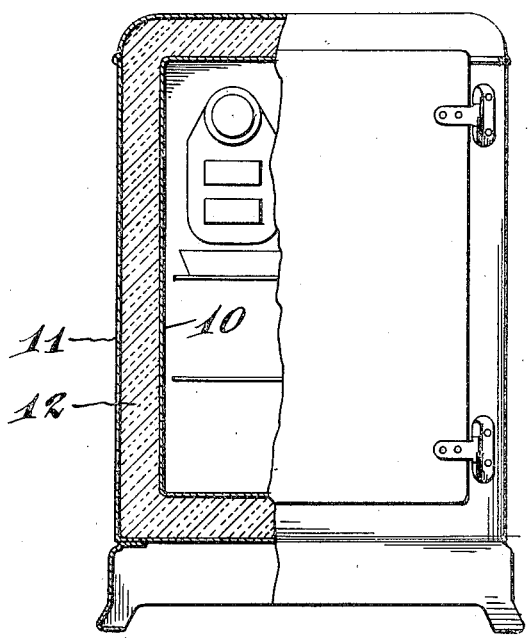
FIG-2-
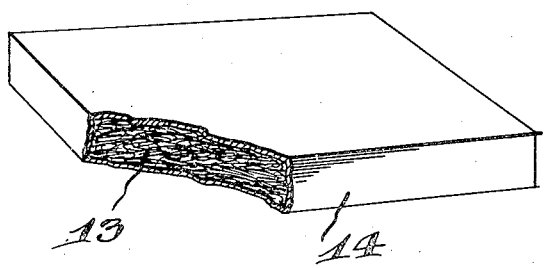
Gamer Slayter
INVENTOR.
BY  J. F. Rule
ATTORNEY.

Patented Oct. 25, 1938

2,134,009

UNITED STATES PATENT OFFICE 2,134,009

LOW TEMPERATURE INSULATION

Games Slayter, Newark, Ohio, assignor to Owens-Illinois Glass Company, a corporation of Ohio Application September 25, 1935, Serial No. 42,014

15 Claims. (Cl. 154—44)

My invention relates to heat insulating materials, and particularly to insulation at relatively low temperatures including a range from 212 degrees F. downward through atmospheric and subatmospheric temperatures.

An object of the invention is to provide an insulating material adapted for use as a refrigerator insulation and in various other situations.

A further object of the invention is to provide means for materially increasing the insulating properties of a low density insulating material such as fine glass wool or other inorganic fibrous material in bulk or matted form.

I have discovered that an insulating material composed of fibers having reflective surfaces, has its insulating value materially increased by applying to said surfaces a thin layer or coating of a powdered substance which has the property of absorbing radiant energy. For example, carbon, red iron oxide, or bentonite may be employed as a coating for the fibers of an insulating base consisting of glass wool or the like. Such coating materials have the property of absorbing radiant energy, thereby preventing the heat rays from being reflected from one surface to another of the insulating base and thus passing through the insulation.

Coating materials which readily absorb the heat rays, effectively retain the heat while at low temperatures and are thus more effective for low temperature insulation than when used with comparatively high temperatures at which the heat is re-radiated and thus transmitted through the insulating body.

I have demonstrated by various tests that the incorporation of a material such as bentonite, lamp black or red iron oxide is effective for the purpose above indicated when applied, for example, to fibrous glass. For instance, in one test which I have made, a fibrous glass mat 4" thick with a density of 1.5# per cubic foot, was tested for heat transmission and found to have a heat transmission coefficient of .33 B. t. u. per square foot, per hour, per degree Fahr., per 1" thickness. This mat was then split into thin layers, approximately ¼" thick, these layers dusted with minute amounts of soot (½% of the weight of the glass), re-assembled and the heat transmission tested. It was found to be .25 B. t. u. per square foot, per hour, per degree Fahr., per 1" thickness.

In the manufacture of fibrous glass insulating material, it is customary to use a tempering or lubricating material, such as oil or an emulsion of oil and water and soap. I have found that when fibrous glass insulating material is manufactured, using a treatment of the following composition:

| | Per cent |
|---|---|
| Stearic acid | 4 |
| Triethanolamine | 1½ |
| "C" mineral oil | 10 |
| Bentonite | 3 |
| Water | 81½ |

(the composition being diluted with one to two parts of water before using), a heat transmission coefficient of .26 B. t. u. per square foot, per hour, per degree Fahr., per 1" thickness, or better, can be obtained when the density of the insulating material is 1.5# per cubic foot.

When the glass insulating material is treated with a composition having the above formula, but omitting the bentonite, no better coefficient can be obtained than .30 B. t. u. per square foot, per hour, per degree Fahr., per 1" thickness.

Tests have also been made using colored glass, by which I have found the heat transmission to be the same with glass fiber masses identical in all respects, except the color of the glass, where in one case the glass was flint, in another case light green, and in another case deep amber. The heat transmission was in each instance from .30 to .33 B. t. u. per square foot, per hour, per degree Fahr., per 1" thickness, without the addition or heat absorbing material such as bentonite, soot, or red iron oxide. When such materials were incorporated, the heat transmission was lower than .26 B. t. u. per square foot, per hour, per degree Fahr., per 1" thickness.

The above and other experiments demonstrate quite conclusively my theory that the heat transmitted does not pass through the glass, but is reflected from the shiny surfaces of the glass fibers. This points to the desirability of coating the surfaces of the fibers with particles of a material which will absorb the radiant heat and thus prevent transmission by reflection from one fibrous surface to another.

It should be noted that very small amounts of soot, bentonite or the like are effected for increasing the insulation valve in the manner above pointed out. The amount of soot effective in this respect is not sufficient to change the white appearance of the mass of fibrous glass which forms the insulation base. The heat transmission coefficients above mentioned were obtained with a mean temperature of approximately 80 degrees F.

Referring to the accompanying drawing:

Fig. 1 is a part sectional elevation of a refrigerator with which insulation of the above indicated character is employed.

Fig. 2 is a perspective view with parts broken away, illustrating a filter pad adapted for use as a refrigerator insulating material.

The refrigerator cabinet comprises an inner wall 10 and an outer wall 11 spaced apart to provide an insulating chamber or compartment which is packed with insulating material 12. This insulating material may consist of fine glass wool in bulk or matted form and of low density. The wool may be treated with a binding material such as above described and/or a heat absorbing material such as carbon, red iron oxide or bentonite, by which the heat insulating value of the material is increased in the manner above set forth.

If desired, the insulating material may consist of individual units such as shown in Fig. 2, each comprising a mass or body 13 of glass fibers. The fibers are preferably bonded together by a suitable binder of such nature that the bonded fibers form a flexible, elastic bat which has sufficiently definite shape and strength to permit it to be installed in the refrigerator, combined with sufficient flexibility and compressibility to cause it to accommodate itself to any irregularities in the wall surfaces, or variations in the spacing between the walls, and thus completely fill the insulating space. As shown in Fig. 2, the filtering material 13 either in bulk or matted form, may be enclosed in a container 14 consisting of cardboard, paper or other suitable material.

The term "low temperature" as employed in the specification and claims may be defined as covering temperatures ranging below 212° F.

Modifications may be resorted to within the spirit and scope of my invention.

I claim:

1. A low temperature insulating material comprising a low density base of solid material having a reflective surface, said material being in open formation and presenting a large surface area dispersed throughout the body of said material, and a finely divided powdered substance which is highly absorbent of radiant energy, forming a coating for said surface.

2. A low temperature heat insulating material comprising a low density base of inorganic fibrous material having a reflective surface, and a coating for said base of a finely divided powdered substance which freely absorbs radiant energy.

3. A low temperature heat insulating material comprising a low density base of inorganic fibrous material having a reflective surface, and a coating for the fibers comprised in said material, said coating consisting of a finely divided substance which readily absorbs radiant energy but does not freely radiate such energy at low temperatures.

4. A low temperature heat insulating material comprising a low density base of glass wool, and a coating for said base of a finely divided powdered substance which freely absorbs radiant energy.

5. A low temperature heat insulating material comprising a low density base of inorganic fibrous material having a reflective surface, and a coating for the fibers comprised in said material, said coating consisting of soot.

6. A low temperature heat insulating material comprising a low density base of inorganic fibrous material having a reflective surface, and a coating for the fibers comprised in said material, said coating consisting of red iron oxide.

7. A low temperature heat insulating material comprising a low density base of inorganic fibrous material having a reflective surface, and a coating for the fibers comprised in said material, said coating consisting of bentonite.

8. A low temperature insulating material comprising a low density base of inorganic fibrous material having a reflective surface, a binder by which the fibers are bonded together, and a coating for the bonded fibers consisting of a finely divided substance which freely absorbs radiant energy.

9. A low temperature insulating material comprising a low density base of inorganic fibrous material having a reflective surface, a lubricating material forming a coating for the fibers, and a finely divided substance combined with said lubricating material which freely absorbs radiant energy but does not freely reradiate such energy at low temperatures.

10. A low temperature insulating material comprising a low density base of the inorganic fibers having reflective surfaces, and a finely divided loading material forming a coating for said fibers, said loading material consisting of a substance which is heat absorbent to a sufficient extent to increase the heat insulating properties of said base to a greater degree than would be effected by a corresponding increase in the density of said base by a more compact arrangement of the fibers.

11. A low temperature insulating material comprising a low density base of inorganic fibers having reflective surfaces, and a surface coating for the fibers comprising said material, said coating being less than 1% by weight of the fibrous base and being a material which is sufficiently heat absorbent to increase the insulating efficiency of the material as a whole substantially more than 1%.

12. A low temperature insulating material comprising a low density base of inorganic fibers having reflective surfaces, and a surface coating for the fibers comprising said material, said coating being less than 1% by weight of the fibrous base and being a material which is sufficiently heat absorbent to increase the insulating efficiency of the material as a whole not less than 10%.

13. A low temperature insulating material comprising a low density base of inorganic fibers having reflective surfaces, and a surface coating for the fibers comprising said material, said coating being less than 1% by weight of the fibrous base and being a material which is sufficiently heat absorbent to increase the insulating efficiency of the material as a whole by a percentage many times greater than the percentage-weight of said coating.

14. An insulating material comprising a base of solid material in open formation having a reflective surface of large area dispersed throughout the body of said material, and a finely divided powdered substance which is highly absorbent to radiant energy, said powdered substance forming a coating over the said surface, and greatly increasing the effective surface area of the solid material.

15. An insulating material comprising a base of solid material having a reflective surface, said material being in open formation and having a large surface area dispersed throughout the body of said material, and a finely divided powdered substance which is highly absorbent to radiant energy, said powdered substance forming a coating over the said surface area and rendering the same substantially radiant heat absorbing.

GAMES SLAYTER.